United States Patent [19]

Rieger

[11] Patent Number: 4,747,027

[45] Date of Patent: May 24, 1988

[54] FLUORESCENT LAMP LIGHT UNIT

[75] Inventor: Bernhard Rieger, Lüdenscheid, Fed. Rep. of Germany

[73] Assignee: Friedhelm Hirt Leuchten, Luedenscheid, Fed. Rep. of Germany

[21] Appl. No.: 43,825

[22] Filed: Apr. 29, 1987

[30] Foreign Application Priority Data

May 22, 1986 [DE] Fed. Rep. of Germany ... 8613788[U]

[51] Int. Cl.[4] ........................... F21V 7/06; G02B 5/10

[52] U.S. Cl. .................................... 362/217; 362/297; 362/346

[58] Field of Search ........................ 362/150, 217–225, 362/297, 346

[56] References Cited

U.S. PATENT DOCUMENTS

| | | | |
|---|---|---|---|
| 2,368,810 | 2/1945 | Donnelly | 362/346 |
| 3,210,538 | 10/1965 | Picha et al. | 362/282 |
| 3,246,138 | 4/1966 | Florence | 362/217 |
| 4,242,725 | 12/1980 | Douma et al. | 362/217 X |

FOREIGN PATENT DOCUMENTS

| | | | |
|---|---|---|---|
| 954489 | 9/1974 | Canada | 362/217 |
| 8006 | 2/1980 | European Pat. Off. | 362/217 |
| 2363838 | 6/1975 | Fed. Rep. of Germany | 362/217 |
| 571042 | 8/1945 | United Kingdom | 362/217 |

*Primary Examiner*—Tony M. Argenbright
*Attorney, Agent, or Firm*—Bacon & Thomas

[57] ABSTRACT

A fluorescent lamp light unit a rectangular housing, one double parabolic head mirror, two side mirrors, and two raster mirrors being provided for each fluorescent lamp. One object of the invention is to maximize the lumicous efficiency with low illumination energy, under utilization of a simple structure. Each side mirror is held under prestressing, on the one hand, on the head wall of the housing beneath the edge of the double parabolic head mirror and, on the other hand, on frontal nose-shaped receptions.

5 Claims, 3 Drawing Sheets

FLUORESCENT LAMP LIGHT UNIT

BACKGROUND OF THE INVENTION

The invention relates to a fluorescent lamp light unit with a rectangular housing, one double parabolic head mirror, two side mirrors, and two raster mirrors being provided for each fluorescent lamp.

SUMMARY OF THE INVENTION

One object of the invention is to maximize the luminous efficiency with low illumination energy, under utilization of a simple structure.

According to the invention this object is solved in that each side mirror is held under prestressing, on the one hand, on the head wall of the housing beneath the edge of the double parabolic head mirror and, on the other hand, on frontal nose-shaped receptions.

By this the usability and practical value of the fluorescent lamp light unit is improved in that the parabola-shaped curvature of the side mirrors is reliably fixed under prestressing by the holding device. The side mirrors cannot deform during the utilization of the light unit. Consequently, the reflection conditions are permanently maintained on the desired optimum value. The holding force required for the prestressing is given by the resetting force of the parabolically deformed side mirror. Thus, it is possible to secure by this simple structure of the light unit a maximum of luminous efficiency on the basis of economical application of energy.

A precise alignment within the housing is secured in that each frontal reception is formed as a cutout in a web projecting transversely from the longitudinal side wall.

In a multiple fluorescent lamp light unit a particularly secure and simple holding of the side mirrors is achieved in that between two adjacent fluorescent lamps on the head wall of the housing resilient webs with hook-shaped holding devices are arranged, the frontal ends of the webs being prestressed against the bottom wall.

The illumination and antidazzle effect is improved in that the rater mirrors are provided as longitudinal webs of the mirror raster and are connected by step lamellae oriented in the traverse direction, and that, on the longitudinal border webs of the mirror raster, slides are provided, which engage receptions of the housing walls and thereby hold the mirror raster.

An optically favourable frontal rim of the fluorescent lamp light unit is achieved in that the mirror raster is flush with housing and is positioned within receiving borders of the housing walls.

BRIEF DESCRIPTION OF THE DRAWINGS

One embodiment of the invention will be described in the following with reference to the accompanying drawings, wherein.

DESCRIPTION OF THE PREFERRED EMBODIMENT

Figure 1:
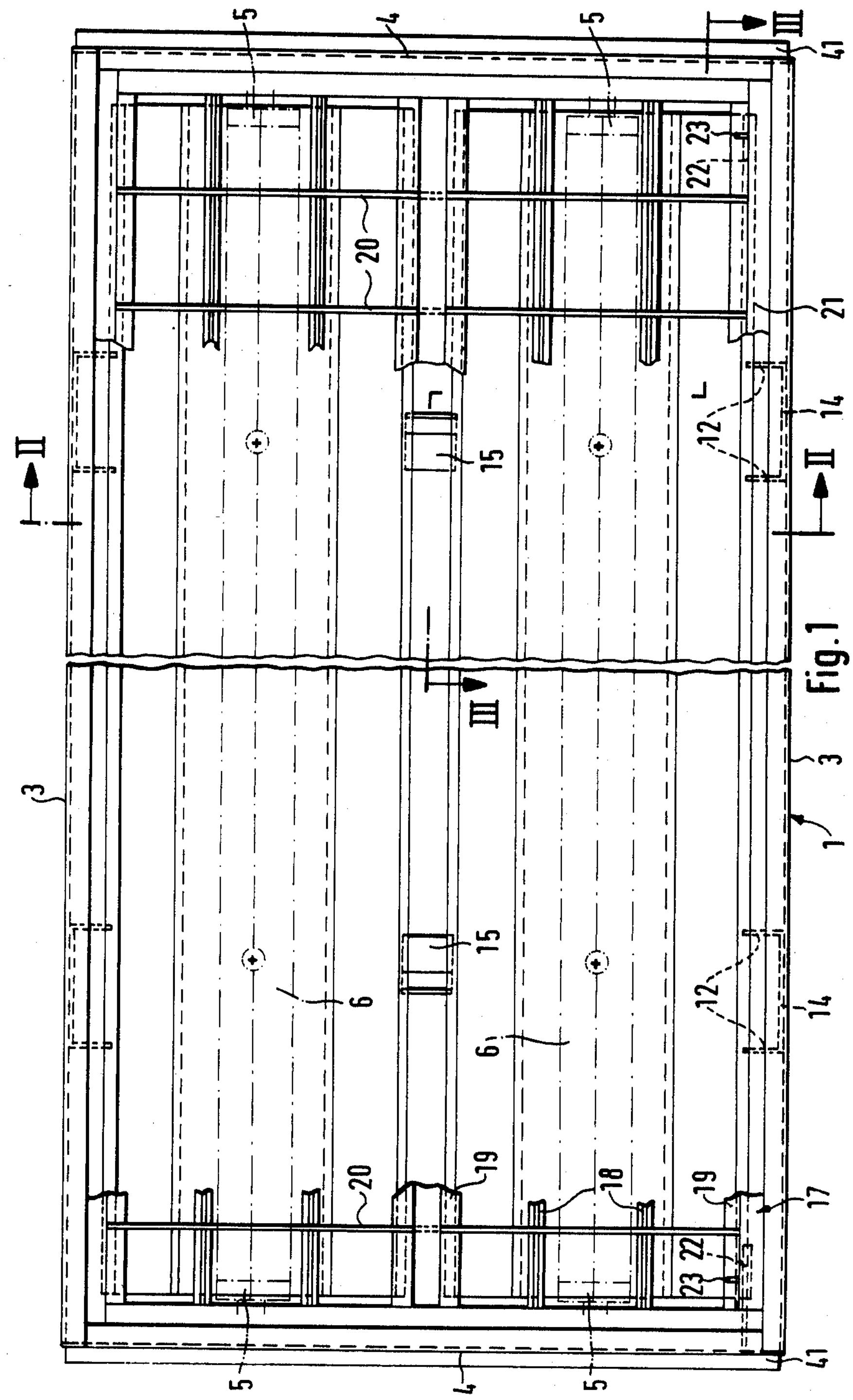
FIG. 1 is a view of a fluorescent lamp light unit, seen towards the mirror raster, partly broken away, and on a reduced scale.

The fluorescent lamp light unit comprises a rectangular housing 1 consisting of a head wall 2, longitudinal side walls 3, and transverse side walls 4. The head wall and the side walls are provided of sheet metal and are partly bent and are attached in the usual manner by folding and welding. On the head wall possibly a fastening device is situated for the suspending of the light unit from a ceiling. In another manner the housing is also provided with positioning webs 41, for the insertion into a raster ceiling.

Figure 2:
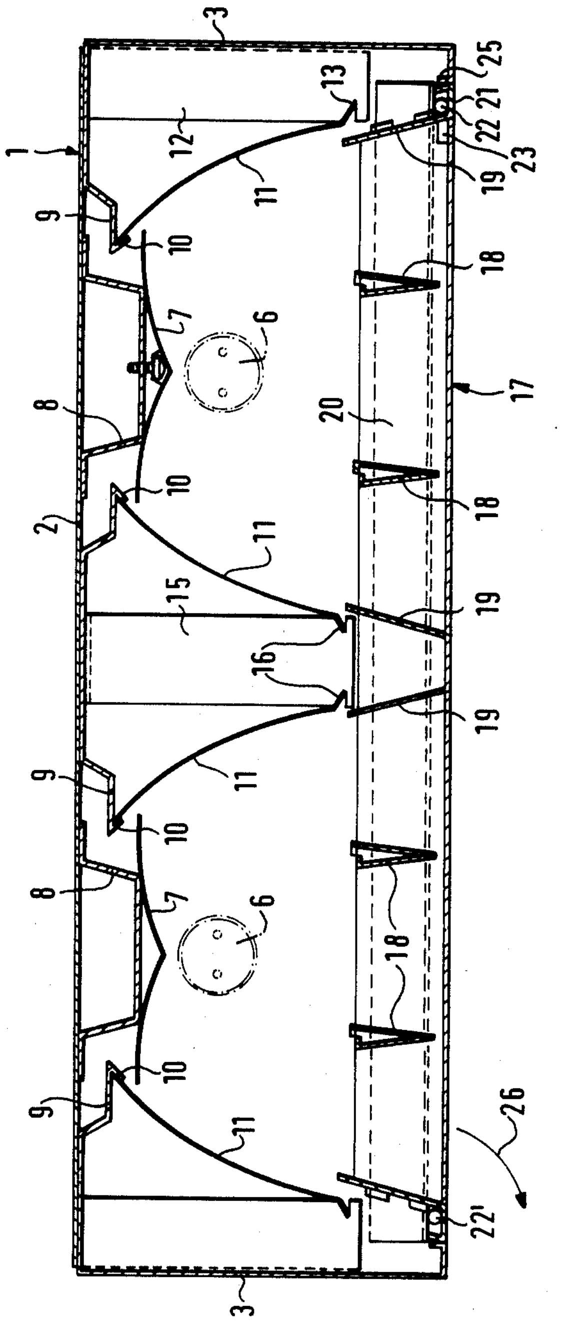
FIG. 2 is a section along line II—II in FIG. 1, whilst
Figure 3:
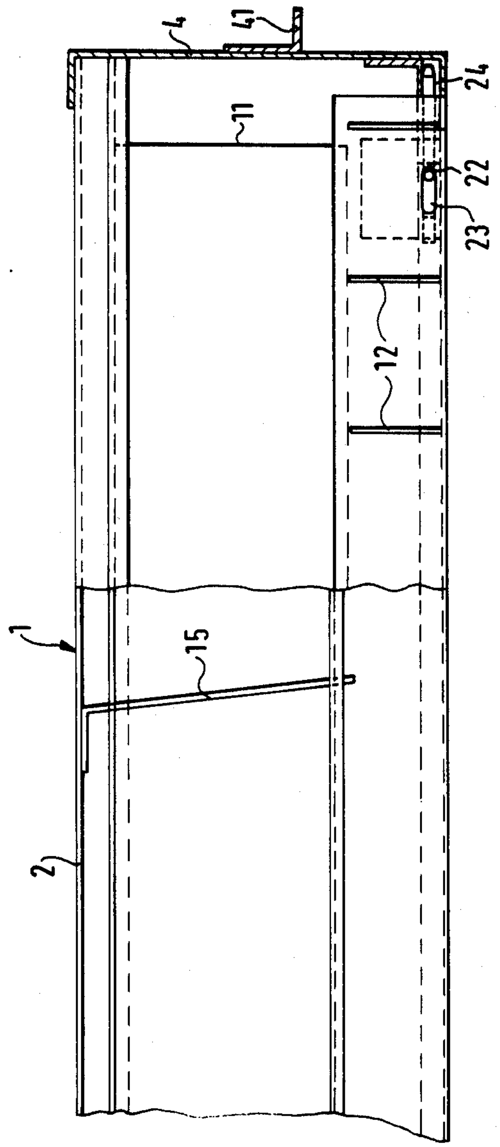
FIG. 3 shows a half-section along line III—III in FIG. 1.

The fluorescent lamp light unit as shown is provided as duplex fluorescent lamp light unit. On the head wall 2 sockets 5 for two fluorescent lamps 6 are provided, which are indicated in FIGS. 1 and 2 in dot-dash lines. For each fluorescent lamp 6 a double parabolic head mirror 7 is mounted on holding devices 8.

On the head wall 2, in addition, receptions with hook-shaped foldings 10 are positioned, for the reception of side mirrors 11. The hook-shaped foldings 10 are situated beneath and within the longitudinal borders of the double parabolic head mirrors 7. For the frontal holding of the side mirrors 11 on one side on the longitudinal side walls 3 webs 12 with hook-shaped holding devices 13 are positioned. In each case two webs 12 are provided, according to FIG. 1, as legs of a U-shaped holding part 14. Between the two fluorescent lamps on the head wall springy webs 15 are provided, which are prestressed against the head wall. On the frontal end of each web 16 a hook-shaped holding device 16 is cut out. Each side mirror 11 with parabolic curvature is clamped under prestressing between the folding 10 and the associated holding device 13 and 16, respectively. By this the parabolic curvature of the side mirror 11 is reliably maintained in use, due to the fact that the restoring force is utilized for maintaining this curvature.

The fluorescent lamp light unit is finished off on the front side by a mirror raster. Some consists of longitudinal webs and raster webs 19, which are connected by stain-frosted step lamellae 20. These parts are put together with the usual manner by folding and correcponding holding in cutouts. The border-positioned raster mirror 19 immediately continue in folded longitudinal border webs 21. In each case on the end of the longitudinal border webs 21 bar-like slides 22 are situated, the operating leg 23 of which extends in each case through the raster mirror 19. The slides 22 engage eye-shaped receptions 24 of the housing. FIG. 2 shows the inserted mirror raster, which is inserted into reception steps 25 of the housing. The slides 22 on one side of the mirror raster permanently engage the reception 24 of the housing 1. The slides 22' on the opposite side can be released so that then it is possible to clamp down the mirror raster in arrow direction 26. In the clamped down condition the interior of the fluorescent lamp light unit is accessible so that then the fluorescent lamps 6 may be changed. Then also other maintenance work is possible.

We claim the following:

1. A fluorescent lamp light unit with a rectangular housing, one double parabolic head mirror, two side mirrors, and two raster mirrors being provided for each fluorescent lamp, characterized in that each side mirror is held under prestressing, on the one hand, on the head wall of the housing beneath the edge of the double parabolic head mirror and, on the other hand, on frontal nose-shaped receptions.

2. Fluorescent lamp light unit according to claim 1, characterized in that each frontal reception is formed as a cutout in a web projecting transversely from the longitudinal side wall.

3. Fluorescent lamp light unit according to claim 1, characterized in that in the case of a multiple fluorescent lamp light unit between two adjacent lamps on the head wall of the housing resilient webs with hook-shaped holding devices are arranged, the frontal ends of the webs being prestressed against a bottom wall.

4. Fluorescent lamp light unit according to claim 1, characterized in that the raster mirrors are provided as longitudinal webs of the mirror raster and are connected by step lamallae oriented in the traverse direction, and that, on the longitudinal border webs of the mirror raster, slides are provided, which slides engage receptions of the housing walls and, thereby, hold the mirror raster.

5. Fluorescent lamp light unit according to claim 4, characterized in that the mirror raster is flush with the housing and is positioned with receiving borders of the housing walls.

* * * * *